(12) United States Patent
Vija et al.

(10) Patent No.: US 8,705,832 B2
(45) Date of Patent: Apr. 22, 2014

(54) REGISTRATION OF EMISSION TOMOGRAPHY AND COMPUTED TOMOGRAPHY

(75) Inventors: Alexander Hans Vija, Evanston, IL (US); Amos Yahil, Stony Brook, NY (US)

(73) Assignee: Siemens Medical Solutions USA, Inc., Malvern, PA (US)

(*) Notice: Subject to any disclaimer, the term of this patent is extended or adjusted under 35 U.S.C. 154(b) by 77 days.

(21) Appl. No.: 13/565,834

(22) Filed: Aug. 3, 2012

(65) Prior Publication Data

US 2013/0034286 A1 Feb. 7, 2013

Related U.S. Application Data

(60) Provisional application No. 61/514,514, filed on Aug. 3, 2011.

(51) Int. Cl.
*G06K 9/00* (2006.01)

(52) U.S. Cl.
USPC ............................................ 382/131; 382/154

(58) Field of Classification Search
USPC .......................................... 382/128, 131, 154
See application file for complete search history.

(56) References Cited

U.S. PATENT DOCUMENTS

| | | |
|---|---|---|
| 2006/0284098 A1 | 12/2006 | Vija |
| 2008/0073543 A1 | 3/2008 | Vija et al. |
| 2008/0273654 A1* | 11/2008 | Rappoport et al. ............. 378/18 |
| 2010/0014732 A1 | 1/2010 | Vija et al. |
| 2010/0056899 A1* | 3/2010 | Toddes et al. ................. 600/411 |

* cited by examiner

*Primary Examiner* — Tom Y Lu
(74) *Attorney, Agent, or Firm* — Peter Kendall

(57) ABSTRACT

Emission tomography is registered with computed tomography or other modality in reconstruction. The anatomical information is used in the emission tomography reconstruction. In addition to an initial registration to use the anatomical information in the reconstruction, the registration is refined one or more times during other iterations refining the reconstruction of the emission volume. The registration is performed as part of the reconstruction. This multi-modal reconstruction may result in an emission tomography volume better aligned with the anatomical information.

18 Claims, 3 Drawing Sheets

REGISTRATION OF EMISSION TOMOGRAPHY AND COMPUTED TOMOGRAPHY

RELATED APPLICATIONS

The present patent document claims the benefit of the filing date under 35 U.S.C. §119(e) of Provisional U.S. Patent Application Ser. No. 61/514,514, filed Aug. 3, 2011, which is hereby incorporated by reference.

BACKGROUND

The present embodiments relate to registration of emission tomography and computed tomography. Emission tomography includes positron emission tomography (PET), single photon emission computed tomography (SPECT), or other nuclear imaging. PET uses a detector ring about a patient to detect pairs of gamma rays emitted due to a collusion of a positron with an electron. The positron is generated by a radionuclide (tracer) introduced into the patient. SPECT also uses introduction of a radioisotope (trace). A gamma camera is rotated about the patient to detect gamma rays emitted by the radionuclide. Both PET and SPECT provide functional information, or information about uptake or other physiological function labeled by the tracer.

Computed tomography (CT) measures attenuation of x-rays through the patient from different angles. CT provides anatomical information. The attenuation may be used in reconstruction of the functional information. The effects of attenuation are accounted for in the emission reconstruction. Since the emission and CT information are acquired by different systems, the relative locations of the volumes are registered with each other. The registration between the volumes is determined between an initial emission volume and a reconstructed CT volume. The determined registration is then used through the various iterations of the emission reconstruction to determine the attenuation for each voxel. However, the registration may be sub-optimal due to processing burden and properties of the volumes. The modality (e.g., emission tomography) with the lesser properties (e.g., lower resolution, higher noise, streaks, or other artifacts) may result in less accurate registration.

BRIEF SUMMARY

By way of introduction, the preferred embodiments described below include methods, systems, and non-transitory computer readable media for registering emission tomography and a volume from another modality in reconstruction. The anatomical information is used in the emission tomography reconstruction. In addition to an initial registration to use the anatomical information in the reconstruction, the registration is refined one or more times during other iterations refining the reconstruction of the emission volume. The registration is performed as part of the reconstruction. This multi-modal reconstruction may result in an emission tomography volume better aligned with the anatomical information.

In a first aspect, a method is provided for registering emission tomography and another three-dimensional imaging modality in reconstruction. A collection of detected emission events are acquired from a volume. A three-dimensional representation of the same volume is acquired from the other three-dimensional imaging modality. An emission tomography representation of the volume is reconstructed from the detected emission events. A registration between the emission tomography representation of the volume and the three-dimensional representation is generated. The emission tomography representation is updated by a second reconstruction from the detected emission events using the registration. The registration is refined further during the second reconstruction. An image is displayed as function of the reconstructed volume.

In a second aspect, a non-transitory computer readable storage medium has stored therein data representing instructions executable by a programmed processor for registering emission tomography and computed tomography in reconstruction. The storage medium includes instructions for performing multi-modality reconstruction of a volume for emission tomography, updating a registration matrix between the emission tomography and computed tomography as part of performing the multi-modality reconstruction, and outputting the registration matrix and the reconstruction of the volume for the emission tomography.

In a third aspect, a non-transitory computer readable storage medium has stored therein data representing instructions executable by a programmed processor for registering emission tomography volume and another volume of another modality in reconstruction. The storage medium includes instructions for initially reconstructing an emission tomography volume from emission events, registering the other volume with the initial reconstruction of the emission tomography volume, and refining the emission tomography volume and the registering iteratively.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

Information from one modality (e.g., CT) may be used to improve reconstruction in the other modality (e.g., emission tomography). In multi-modal reconstruction, anatomical (e.g., CT) data may be used to constrain and improve the emission reconstruction. The spatial registration between the volumes is incorporated within the multi-modal reconstruction process. The projection operator for reconstruction includes the registration matrix as additional parameters to be fit during reconstruction.

CT information is used in emission reconstruction to make the emission reconstruction better or to correct for the effects of attenuation. The reconstructed CT volume or the Mu map, which is generated from the CT values, is spatially in a CT reference frame. The emission volume is in an emission reference frame. These two reference frames are registered to allow for correction or accounting for attenuation in the emission reconstruction. The registration matrix (rm) may be written as 4×4 matrix to describe 3D rotation and translation. Previous approaches compute rm given the two volumes just once before the fully corrected emission reconstruction is output. Instead of using this single registration, the rm may also be computed inside the reconstruction process of the emission volume. Initial computation of the rm is performed, such as using the first initial reconstruction. Additionally, the rm is slightly modified or refined in the process of emission reconstruction due to inclusion of registration in the reconstruction. Emission reconstruction is essentially solving a very high dimensional minimization problem, where each voxel is one variable, potentially a $N^3$ matrix, with the goal to minimize some objective function of some distance measure between data and a data model over these variables. The data model is the result of the projection operator applied to the estimated activity concentration, essentially simulating the emission system. The projection operator includes the Mu map, as the Mu map is used to account for attenuation during the projection of each view. Thus, the two reference frames are aligned or registered to use the Mu map in the reconstruction. By also allowing minimizing over the 16 additional parameters of the registration matrix, the initial registration is fine tuned during each iteration. As the emission images become better, the registration becomes better.

Figure 1:
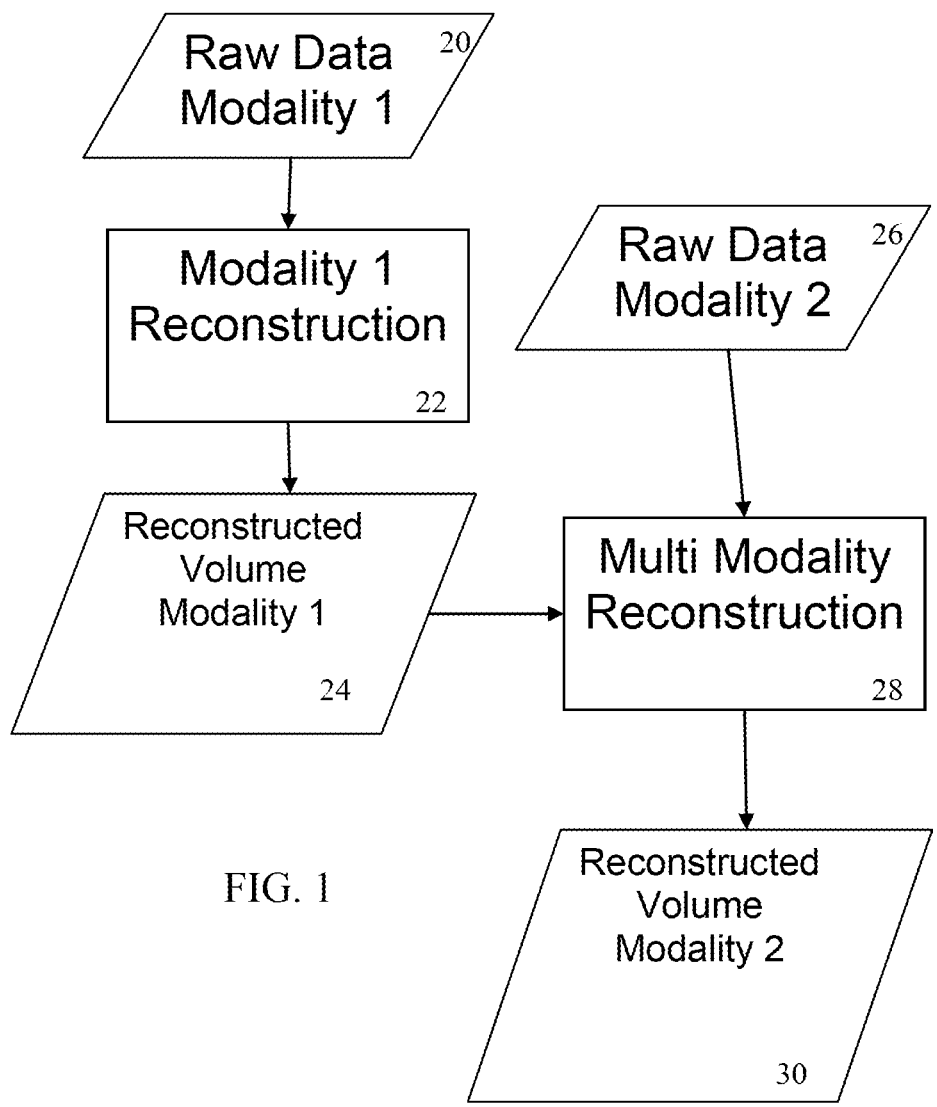
FIG. 1 is a flow chart diagram of one embodiment of a method for registering emission tomography and computed tomography in reconstruction.
Figure 2:
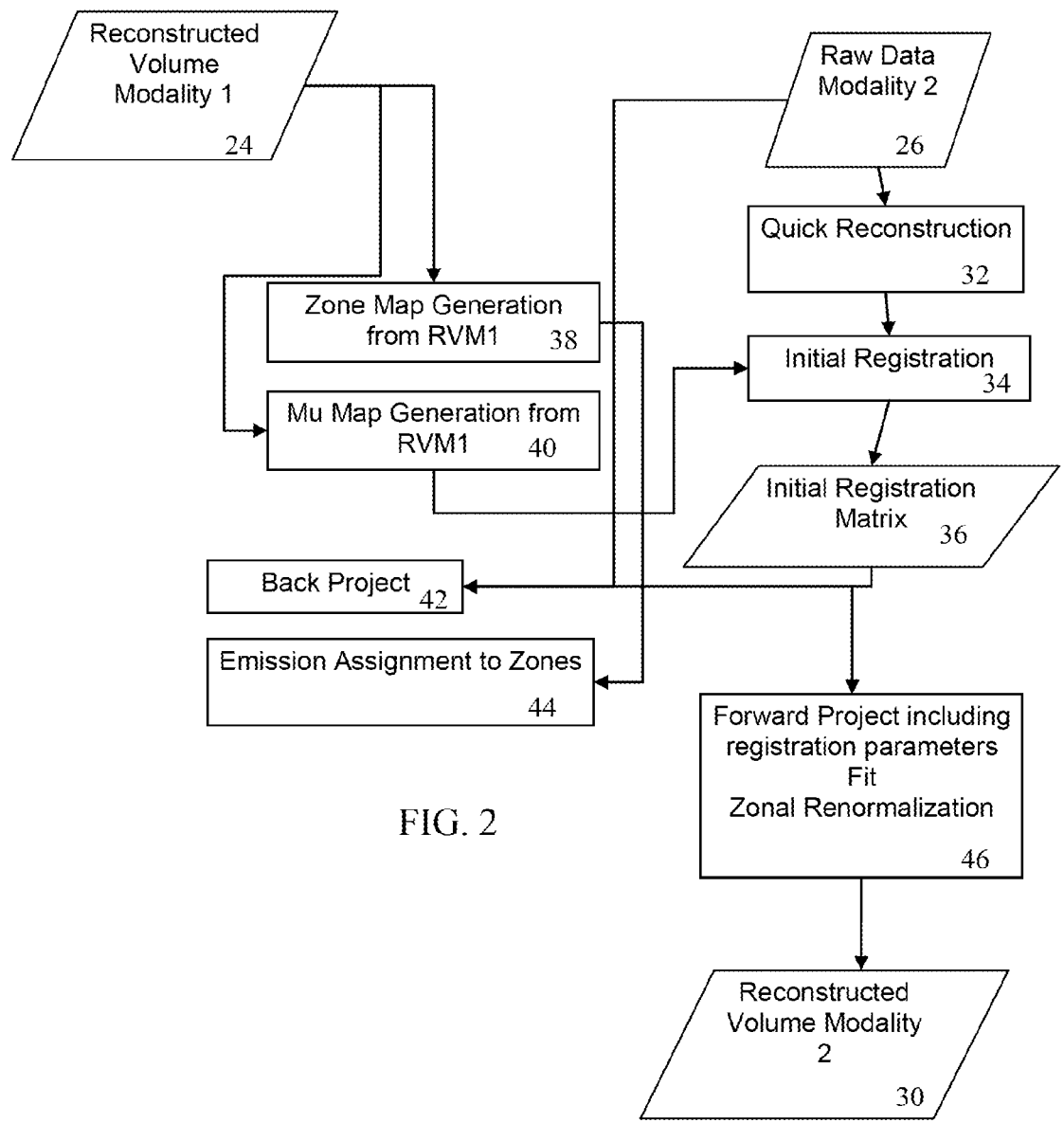
FIG. 2 is a flow chart of another embodiment of a method for registering emission tomography and computed tomography in reconstruction.

FIG. 1 shows a method for registering emission tomography and computed tomography in reconstruction. FIG. 2 shows an embodiment of FIG. 1 implemented in multi-modal reconstruction. Additional, different, or fewer acts may be performed. For example, the zone related acts 38 and 44 are not performed. The acts are performed in the order shown or a different order.

In act 20 of FIG. 1, raw data for one modality is acquired. The acquisition is by scanning, such as with a CT scanner. Alternatively, the acquisition is by transfer from another source or upload from memory.

Any modality, such as CT, magnetic resonance, or ultrasound, may be used to acquire anatomical information. The anatomical information may include functional information, such as functional magnetic resonance imaging (fMRI).

In one embodiment, the raw data represents projection attenuation values for x-rays. Each attenuation value represents an integration of x-ray attenuation along a line. By acquiring attenuation values for different lines or angles through a patient, attenuation values that may be reconstructed into an object space volume are acquired.

In act 26, raw data for another modality is acquired. The acquisition is by scanning, such as with an emission tomography system (e.g., PET or SPECT). The acquisition may be by transfer or upload.

The scanning acquires detected emission events for functional information. For PET, each detected emission event corresponds to a line through a patient. For SPECT, the gamma camera obtains signal along a ray from an unknown depth. By detecting emission events from different angles around a patient, a volume may be reconstructed.

The raw data from the different modalities is acquired with separate scanners, such as CT and PET scanners with different housings or in different rooms. Alternatively, the raw data is acquired with a hybrid system. A collection of emission events and attenuation values from the patient volume are acquired using scanners integrated together in a same housing and/or room. For example, CT and PET systems are combined. As another example, CT and SPECT systems are combined. The combination results in a known spatial relationship of the CT to the PET or SPECT systems. In other embodiments, the spatial relationship is unknown. Calibration may be used to define a spatial relationship in other embodiments.

The acquired data is used for reconstruction of an emission tomography representation of the volume. The iterative reconstruction also includes refinement of registration between the updated reconstruction of the emission volume and the volume from the other modality. The registration of the reconstructed volume of functional information with a reconstruction of the anatomical information is refined during reconstruction of the emission volume. The translation, rotation, scaling, or combinations thereof are determined for the functional information relative to the anatomical information.

The registration is determined as part of the reconstruction of the emission tomography volume. Using anatomical information in the functional information reconstruction provides multi-modality reconstruction.

For registering, the multi-modality reconstruction uses the anatomical information in the object or volume space. In act 22, the acquired raw data for the anatomical information is reconstructed into object or volume space. Any reconstruction may be used, such as using any CT reconstruction of the volume. For example, a filtered back projection algorithm assembles x-ray projection images from different angles into voxels in object space. Each voxel is associated with an attenuation coefficient. The resulting object space model is a reconstructed volume 24 of anatomical information.

This reconstructed volume is used to create a map of attenuation coefficients as a function of space in three dimensions in act 40 (see FIG. 2). The Mu map is the linear attenuation at each voxel. The CT measures are translated into a Mu map, such as described in U.S. Published Patent Application Nos. 20080073543 and 20060284098, the disclosures of which are incorporated herein by reference. This map of attenuation coefficients may be referred to as a Mu (p) map. The map is the spatial distribution in the volume. The CT information may be used in the emission reconstruction to make the reconstruction better by correcting for the effects of attenuation.

In act 28, multi-modality reconstruction of a volume for emission tomography is performed. In one embodiment, the multi-modality reconstruction described in U.S. Published Patent Application No. 2010/0014732 is performed. Other reconstruction may be used.

The reconstructed CT volume or the Mu map is spatially in the CT reference frame or a coordinate system established by the CT scan. The emission volume is in the "emission reference frame" or a coordinate system established by the emission scan. These two reference frames are to be registered.

The registration matrix, rm, may be initially computed given the two volumes. In the embodiment of FIG. 2, the multi-modality reconstruction initially reconstructs the emission volume. A quick reconstruction is performed in act 32. The quick reconstruction provides an initial volume based on the emission events. The initial reconstruction of act 32 may be a first iteration of the projections in act 42, 46 or may be handled as a separate reconstruction. Initial computation of the rm is performed the one time, such as the first initial solution.

In act 34, the initial volume is registered with the anatomical volume, such as the CT volume 24 or the Mu map. Using attenuation coefficients, the Mu map is registered to the initial reconstruction from the emission events. Any registration may be provided. For example, different relative translation, rotations, scales, or combinations are attempted. For each, a distance measure indicates a similarity of the data. For example, a correlation or sum of absolute difference is calculated. The translation, rotation, scale, or combination resulting in the greatest similarity or least difference indicates the registration. Rigid or non-rigid registration may be used. The reconstructed volumes are registered without further processing. Alternatively, downsampling, upsampling, filtering, or other processes so that one type of data more closely resembles another type of data may be performed prior to registration.

The result of the registration is a registration matrix 36. The registration matrix 36 represents the translation, rotation, and/or scale for the alignment of the volumes. The registration matrix 36 incorporates three rotation, three translation, and/or three scaling degrees of freedom for the volumes and/or for each voxel of the volumes. For example, the registration matrix (rm) may be written as a 4×4 matrix to describe 3D rotation and translation. The registration matrix 36 may be for rigid or non-rigid transformation.

The registration matrix 36 is incorporated in the projections used for reconstructing the volume for the functional information. The back projection of act 42 and the forward projection of act 46 include the registration matrix.

In addition to the one registration, the rm is computed inside the reconstruction process of the emission volume. Instead of performing the registration once before the fully corrected emission reconstruction, the registration is performed multiple times. By including the rm computation in the reconstruction, the rm is solved multiple times and may be slightly modified or refined in the process of emission reconstruction.

For projecting, a system matrix is used to create a data model of the object space volume. The data model is the result of the projection operator applied to the estimated activity concentration, essentially simulating the emission system. Emission reconstruction solves a high dimensional minimization problem, where each voxel is one variable, potentially a $N^3$ matrix, with the goal to minimize some objective function of some distance measure between data and the data model over these variables.

The projection operation includes attenuation, such as the Mu map. The projection operator includes the Mu map, to correctly account for attenuation during the projection of each view. Since gamma rays may be altered by tissue in a similar manner to attenuation of x-rays, the emission events are subject to the anatomical structure represented by the attenuation coefficients.

In addition to terms for the emission events, the registration matrix is included. Activity concentration of the emission events is estimated with an unknown term as the registration. The initial registration matrix 36 is a starting point for projecting the Mu map with the emission events.

The reconstruction of the emission volume also includes refining the registration of the anatomical information to the emission volume. The data model includes a delta term representing registration. The delta term may be limited in deviation, such that the refinement is limited.

The registration is combined with the emission reconstruction. The combination includes registration as well as projection for reconstruction in each iteration. The registration is performed as part of the miniziation in iterations of the projections. By also allowing minimization over the sixteen or fewer additional parameters of the registration matrix for registration, the initial registration is fine tuned during each iteration. As the emission image becomes better, the registration becomes better.

Non-rigid registration uses the entire sixteen parameters of the registration matrix. A rigid transformation may not include some parameters or sets some as a unity or one value.

In one embodiment, the registration is incorporated as a separate act in the projection. A first registration is assigned, such as the initial registration matrix 36. The emission reconstruction is performed. A level of similarity or alignment of the most recent reconstructed object or emission volume with the anatomical information is determined. The attenuation mis-alignment with the reconstructed emission data model is measured. Where the level is below a threshold, a different registration is assigned, the reconstruction is repeated, and the similarity measured again. Once the level of similarity is maximized, the registration is solved. When the level of similarity is above the threshold, the registration is determined. Where the reconstruction cost (e.g., chi-squared) is minimized and the registration is sufficient, a final data model of the volume of the functional information is output. The registration of the anatomical information is used for reconstruction and/or output.

In another embodiment, the registration is performed with the iterations of the reconstruction using a registration cost function. In each iteration of the emission reconstruction, a cost is minimized. The cost may be a chi-squared cost, or other cost for emission, but is similarity or other cost for registration. For example, the iterations alternate between relative movement for registration and reconstruction. For an iteration of the solution for registration, the anatomical information relative to the current reconstruction or data model of the reconstruction is shifted (e.g., translated, rotated, and/or scaled). The shift with the minimum cost or maximum similarity is identified. In a subsequent iteration, the detected emission events are again reconstructed by minimizing a reconstruction cost function, such as chi-squared. This updated emission reconstruction is used for minimizing the registration in the next iteration. The registration may be performed with other frequencies, such as every third iteration. Where the reconstruction cost (e.g., chi-squared) is minimized, the registration may be repeated once more. The registration with the final reconstruction of the emission events is output.

During back and forward projection operations of acts 42 and 46, the registration matrix is refined as well as the emission events being reconstructed into a data model representing the object. The relative position of the anatomical information to the functional information is determined as part of the multi-modal reconstruction, resulting in a registration matrix representing translation, rotation, and/or scaling as well as a reconstructed emission tomography volume. The emission tomography volume formation also includes refining the registration matrix within the iterations. As the volume for the emission tomography is updated in reconstruction, the shift relative to the computed tomography or other anatomical volume is determined.

In act 38, the object volume is divided into zones. The anatomical information is used to divide into zones, such as performing segmentation. In act 44, the detected emission events are assigned to zones. The object space is divided into zones, such as a different zone for each of multiple objects (e.g., different organs). As part of the reconstruction, different settings or approaches may be applied to the data of the different zones. For example, different smoothing or the same smoothing but on the different data is applied in one or more of the zones. The data model of the emission events or the current reconstruction is smoothed. The image object is reconstructed on the basis of the smoothed zonal object. In one embodiment, the multi-modal image reconstruction with zonal smoothing disclosed in U.S. Published Patent Application No. 2010/0014732, the disclosure of which is incorporated herein by reference, is used.

The zone assignments are incorporated into the backward and forward projecting of acts 42 and 46. For example, the functional data is back projected. Coefficients from the back projection are assigned to zones. The zones are determined based on the anatomical information. The image objects from the back projection of the functional data are smoothed. The smoothing is performed separately and/or differently for the different zones. The resulting zonal image objects are forward projected. The resulting zonal projections are combined, and linear coefficients with the best fit are found. The zonal image objects and projection are normalized. The goodness of the fit is then determined. If the fit is insufficient, the process is repeated until a final image object is output.

Similarly, the registration is determined for each zonal object and/or for the combined zonal projections. If the registration is determined separately for the zones, the registrations may be combined. For a rigid motion, the average translation, rotation, and/or scaling is determined. For non-rigid motion, the registration matrices for the different zones are combined into a registration matrix for the entire volume.

In act 30 of FIGS. 1 and 2, the reconstructed volume for emission tomography is output. The output may be in the form of voxels with intensity values assigned from the data model of the reconstruction. Alternatively, the output is of a projection of the data model onto a viewing or image plane.

The reconstructed volume includes corrections for the attenuation. The registration matrix is used during reconstruction to spatially apply the appropriate attenuation in the correction. The registration matrix is used within the reconstruction for the attenuation correction.

The registration matrix may also be output. The registration matrix indicates the spatial relationship of the emission tomography volume with the anatomical (e.g., CT) volume. The registration may be used to align the volumes for display or calculation. For example, the anatomical information is used to generate a gray scale image. The functional information is used to color code the image for function. The registration is used to determine the position of the color coding relative to the gray scale image.

The reconstructed volumes may be output for storage. Alternatively, one or more images of the reconstructed volume are displayed. Any functional, anatomical, or functional and anatomical imaging may be used. Cross sections of the volume may be mapped to display values. The volumes may be rendered, such as using surface or projection rendering, from one or more viewing directions.

Figure 3:
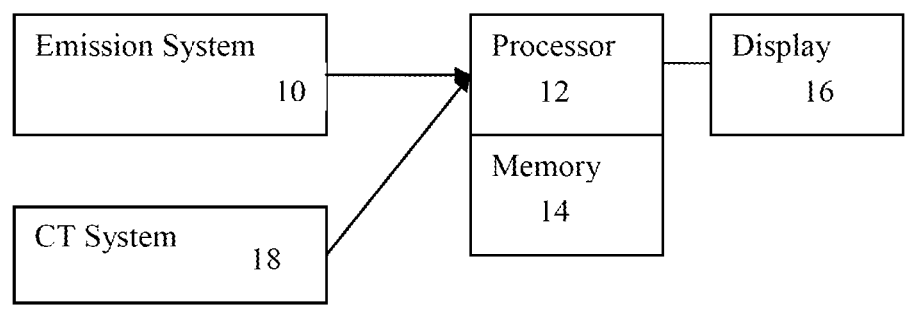
FIG. 3 is a block diagram of a system, according to one embodiment, for registering emission tomography and computed tomography in reconstruction.

FIG. 3 shows a system 10 for registering emission tomography and computed tomography in reconstruction. The system 10 includes an emission system 10, a computed tomography system 18, a processor 12, a memory 14, and a display 16. The processor 12, memory 14, and/or display 16 are part of the emission system 10, part of the CT system 18, or are separate (e.g., a computer or workstation). Additional, different, or fewer components may be provided. For example, the system is a computer without the emission system 10 or the CT system 18. As another example, the system 10 includes a magnetic resonance system in addition to or as a replacement for the CT system 18. Other parts of the system may include power supplies, communications systems, and user interface systems.

The emission system 10 is a PET, SPECT, or other nuclear imaging system. As a PET system, a detector array of scintillation crystals coupled to avalanche photo diodes or photomultiplier tubes is in a ring around a patient. The detectors are arranged individually or in groups. The detectors generate three analog signals, two position signals and one energy signal. Other formats may be provided. The signals from the detectors are processed to identify specific events. The timing and location information are used to determine the existence of a valid event (i.e., positron emission) and the location of the event (e.g., line along which the event occurred).

As a SPECT system, one or more gamma cameras are connected with a gantry. The gamma cameras rotate about the patient. The emission events are detected with the camera at different position or angles relative to the patient.

The CT system 18 includes an x-ray source and detector connected to a gantry. The gantry moves the x-ray source and detector around the patient to scan. The same or different gantry may be used with the gamma camera of the SPECT system.

In one embodiment, the emission system 10 and the CT system 18 are in a same room with a shared patient bed. A robot or track guides the bed to position the patient in the desired system for scanning at a given time. In another embodiment, the emission system 10 and the CT system 18 share a same housing in a hybrid system. The patient is positioned in a bore or on a bed. Both systems 10, 18 are arranged to scan the patient while the patient is in the same general position, either sequentially or simultaneously.

The detected attenuation, emission events, other anatomical information, other functional information, or other scan data is stored in the memory 14. The data is stored in any format. The memory 14 is a buffer, cache, RAM, removable media, hard drive, magnetic, optical, database, or other now known or later developed memory. The memory 14 is a single device or group of two or more devices. The memory 14 is part of emission system 10, the CT system 18, or a remote workstation or database, such as a PACS memory.

The memory 14 may store data at different stages of processing, such as raw data representing detected events without further processing, filtered or thresholded data prior to reconstruction, reconstructed data, filtered reconstruction data, registration matrix, system matrix, data model, projection data, thresholds, an image to be displayed, an already displayed image, or other data. The memory 14 or a different memory stores data used for processing, such as storing the data after one or more iterations and prior to a final iteration in reconstruction. For processing, the data bypasses the memory 14, is temporarily stored in the memory 14, or is loaded from the memory 14.

The memory 17 is additionally or alternatively a non-transitory computer readable storage medium with processing instructions. The memory 14 stores data representing instructions executable by the programmed processor 12 for registering emission tomography and computed tomography in reconstruction. The instructions are for receiving transmitted data a progressive hierarchy of resolution and/or performing CAD on such data. The instructions for implementing the processes, methods and/or techniques discussed herein are provided on non-transitory computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multi-processing, multitasking, parallel processing and the like. In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

The processor 12 is a general processor, digital signal processor, graphics processing unit, application specific integrated circuit, field programmable gate array, digital circuit, analog circuit, combinations thereof, or other now known or later developed device for processing emission information. The processor 12 is a single device, a plurality of devices, or a network. For more than one device, parallel or sequential division of processing may be used. Different devices making up the processor 12 may perform different functions, such as one processor for forming a matrix and/or filtering and an application specific integrated circuit or field programmable gate array for performing iterative reconstruction. In one embodiment, the processor 12 is a control processor or other processor of emission system 10 or the CT system 18. In other embodiments, the processor 12 is part of a separate workstation or computer.

The processor 12 operates pursuant to stored instructions to perform various acts described herein, such as registering functional information with anatomical information and reconstructing the anatomical and/or functional volumes. The processor 12 is configured by software and/or hardware to perform any or all of the acts of FIG. 1 or 2.

The display 16 is a CRT, LCD, plasma screen, projector, printer, or other output device for showing an image. The display 16 displays an image of the reconstructed functional volume and/or anatomical volume. A combined image based on the registration may be displayed. For example, a maximum intensity projection image of anatomy with color modulated as a function of the functional information is displayed. The image represents the reconstruction of the detected events in a volume from a viewing direction. More than one image may be shown, such as displaying renderings of the functional and anatomical volumes side by side. The positioning and relative orientation of the adjacent renderings may be based on the relative registration. The display 16 may display a value, graph, notation, annotation or other information calculated using the registration.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A method for registering emission tomography and another three-dimensional imaging modality in reconstruction, the method comprising:
    acquiring a collection of detected emission events from a volume;
    acquiring a three-dimensional representation of the same volume from the other three-dimensional imaging modality;
    reconstructing an emission tomography representation of the volume from the detected emission events;
    generating a registration between the emission tomography representation of the volume and the three-dimensional representation;
    updating the emission tomography representation by a second reconstruction from the detected emission events using the registration;
    refining the registration further during the second reconstruction; and
    displaying an image as function of the reconstructed volume,
    wherein updating and refining comprise projecting, the projecting further comprising
    including a registration cost function; and
    minimizing the cost as part of the updating.

2. The method of claim 1 wherein acquiring the collection and the three-dimensional representation comprises acquiring with a hybrid computed tomography and positron emission system.

3. The method of claim 1 wherein acquiring the collection and the three-dimensional representation comprises acquiring with a hybrid computed tomography and single photon computed tomography system.

4. The method of claim 1 wherein acquiring the three-dimensional representation comprises acquire a reconstructed computed tomography volume, a magnetic resonance volume, or an ultrasound volume.

5. The method of claim 1 wherein reconstructing comprises estimating activity concentration of the emission events.

6. The method of claim 1 wherein acquiring the three-dimensional representation comprises generating a Mu map from attenuation.

7. The method of claim 1 wherein reconstructing comprises an initial reconstructing in a sequence of iterative reconstructions.

8. The method of claim 1 wherein updating and refining comprise projecting, the projecting comprising:
    attempting a first registration of the emission events to the three-dimensional representation;
    reconstructing based on the first registration;
    determining a level of similarity of the reconstructed volume with the three-dimensional representation;
    where the level is below a threshold, repeating the attempting, reconstructing and determining with a different registration until the level is above the threshold.

9. The method of claim 1 wherein the generating comprises determining the registration as translation and rotation.

10. In a non-transitory computer readable storage medium having stored therein data representing instructions executable by a programmed processor for registering emission tomography and computed tomography in reconstruction, the storage medium comprising instructions for:
    performing multi-modality reconstruction of a volume for emission tomography;
    updating a registration matrix between the emission tomography and computed tomography as part of performing the multi-modality reconstruction; and
    outputting the reconstruction of the volume for the emission tomography,
    wherein updating comprises incorporating a cost function that is a function of registration, selecting either relative movement or reconstruction for each iteration of a plurality of iterations of the updating, and minimizing the cost function for each iteration.

11. The non-transitory computer readable storage medium of claim 10 wherein performing comprises projecting.

12. The non-transitory computer readable storage medium of claim 10 wherein updating comprises iterating reconstruction with different registrations of the volume for the emission tomography with a volume for the computed tomography and identifying the reconstruction where the emission events spatially align with the volume for the computed tomography.

13. The non-transitory computer readable storage medium of claim 10 further comprising:
reconstructing a computed tomography volume; and
generating a Mu map as a function of attenuation from the computed tomography volume;
reconstructing an initial volume from emission events; and
initially registering the Mu map with the initial volume, the initially registering providing an initial iteration; and
wherein performing comprises projecting as a function of the initial iteration of the registration matrix.

14. The non-transitory computer readable storage medium of claim 10 further comprising incorporating zones from the computed tomography into performing the reconstruction of the volume of the emission tomography.

15. The non-transitory computer readable storage medium of claim 10 wherein updating the registration matrix comprises determining a translation, rotation, or translation and rotation of the volume for the emission tomography with a volume for the computed tomography.

16. In a non-transitory computer readable storage medium having stored therein data representing instructions executable by a programmed processor for registering emission tomography volume and another volume of another modality in reconstruction, the storage medium comprising instructions for:
initially reconstructing an emission tomography volume from emission events;
registering the other volume with the initial reconstruction of the emission tomography volume; and
refining the emission tomography volume and the registering iteratively.

17. The non-transitory computer readable storage medium of claim 16 wherein refining comprises reconstructing the emission tomography volume using the registration and refining the registration further during the reconstruction.

18. The non-transitory computer readable storage medium of claim 16 further comprising incorporating zone assignments into the back and forward projecting.

* * * * *